Patented Mar. 19, 1940

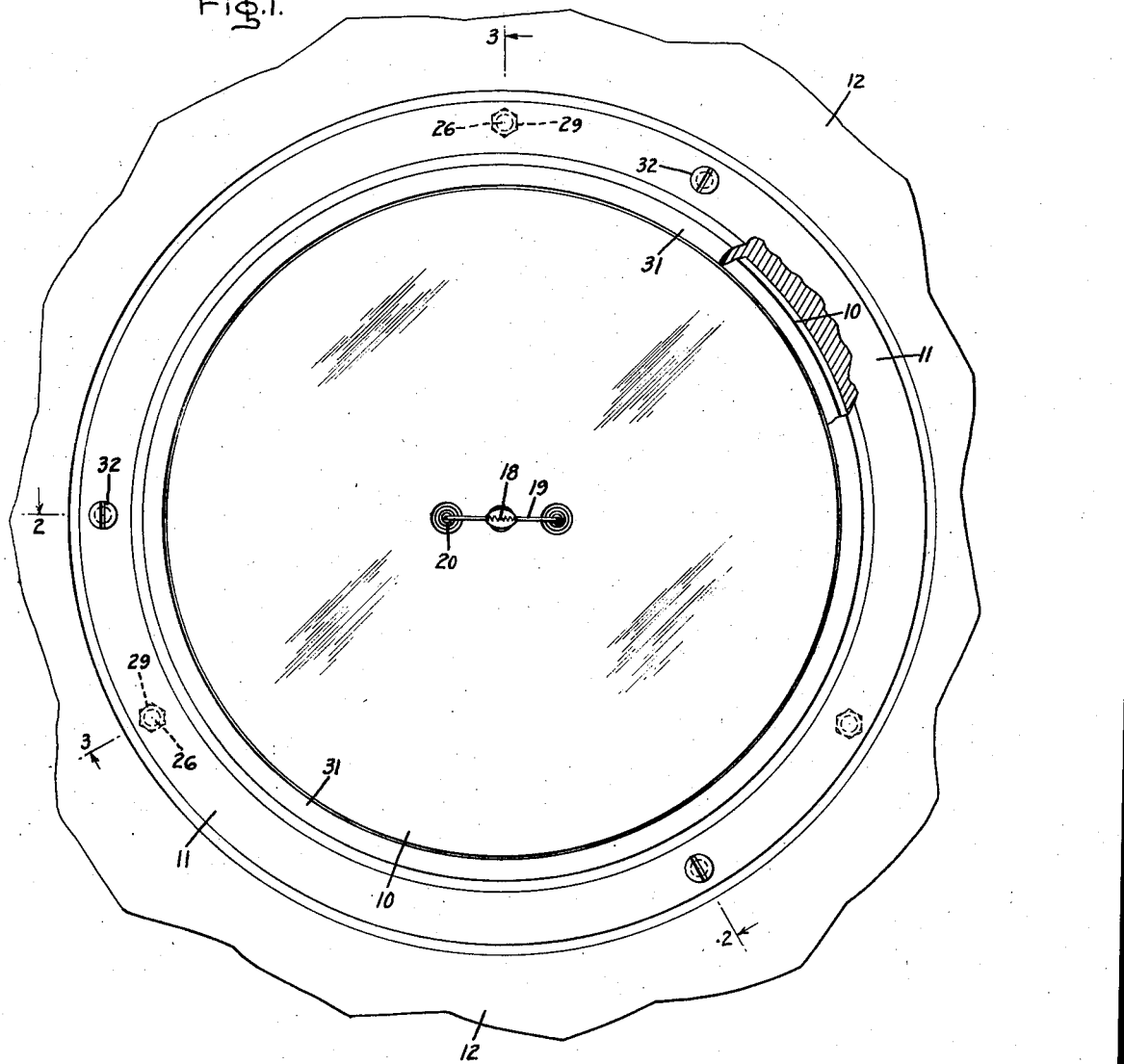

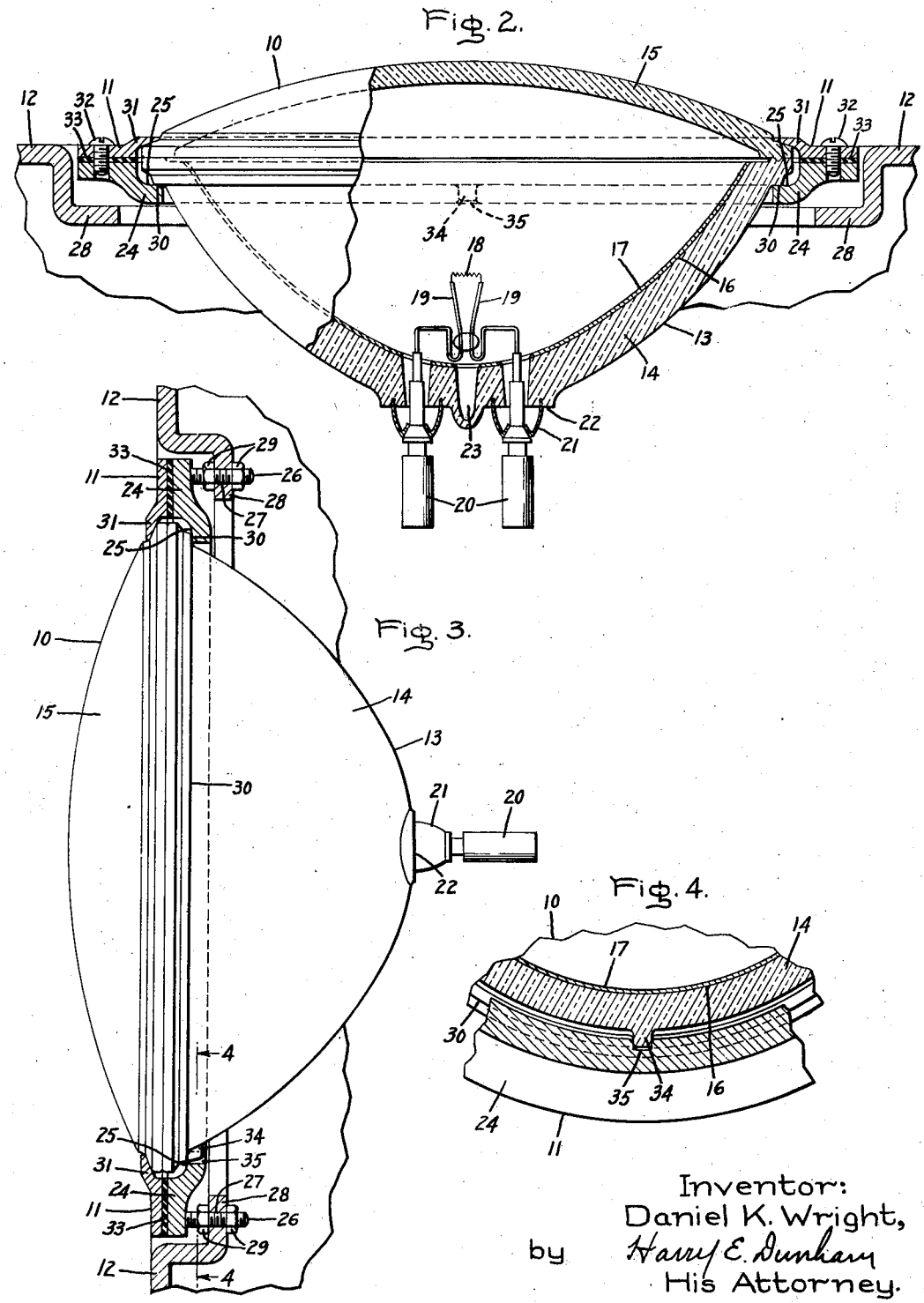

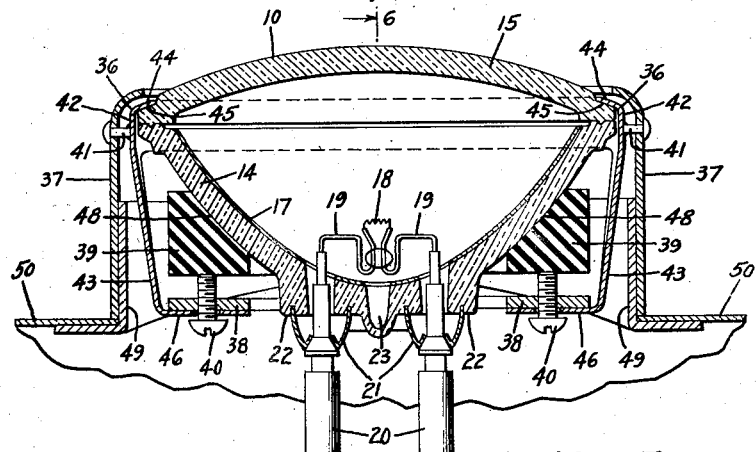
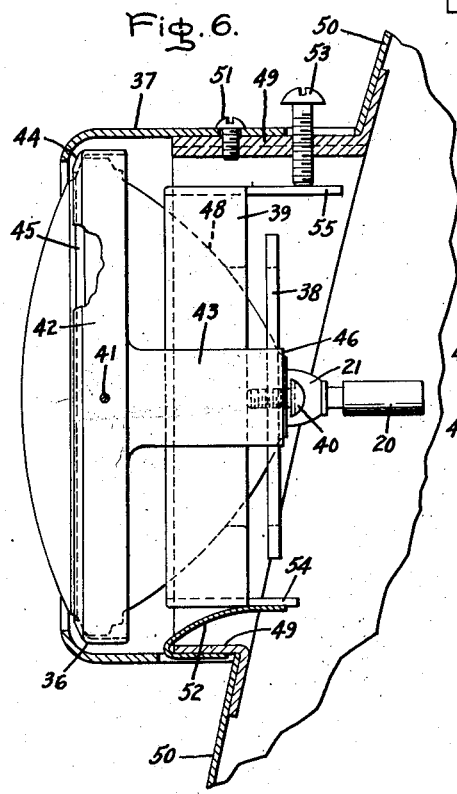
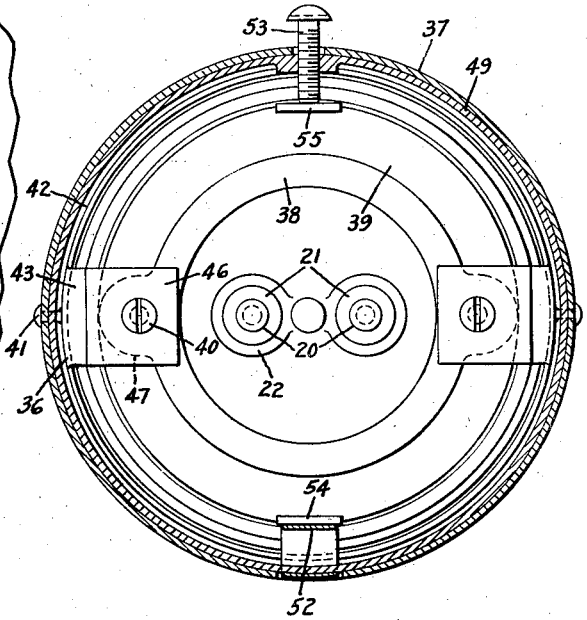

2,194,373

UNITED STATES PATENT OFFICE 2,194,373

ELECTRIC LAMP AND MOUNTING THEREFOR

Daniel K. Wright, Cleveland Heights, Ohio, assignor to General Electric Company, a corporation of New York Application May 19, 1937, Serial No. 143,505

6 Claims. (Cl. 176—34)

My invention relates to mountings for light projection devices, and more particularly to mountings for light projection devices of the reflector lamp type such as are disclosed and claimed in my co-pending United States applications, Serial No. 68,713, filed March 13, 1936, of which the present case is a continuation-in-part, and Serial No. 143,504 of even date, now Patent 2,148,314, containing claims to the lamp per se described herein. The invention herein described is especially useful for mounting projection devices of the above-mentioned type on automobiles and other vehicles to thereby form a novel headlamp construction for such vehicles.

According to the invention, the holder or mounting means is adapted to support or engage the projection device at and adjacent to the periphery of the same, whereby the danger of breakage of such device during insertion in the holder, or when subjected to severe shocks and jars during service, is minimized. Another object of the invention is the provision of mounting means for such projection devices whereby the same may be quickly and accurately mounted in predetermined relationship with respect to the supporting structure, so that the beam of light projected by the device will extend in the exact direction desired. Still another object of the invention is the provision of means for adjusting the position of the holder or mounting with respect to the supporting structure whereby the direction of the beam projected by the associated projection device may be adjusted as desired. A further object of the invention is the provision of a pivotal mounting for projection devices of the type referred to above, whereby the tilt or angle of the light beam may be readily adjusted or regulated as desired.

Other objects and advantages of the invention will appear by reference to the following detailed description of species thereof taken in connection with the accompanying drawings in which Fig. 1 is a front elevation of the preferred form of mounting comprising my invention, a portion of which is broken away to more clearly illustrate the same; Fig. 2 is a sectional view taken on the line 2—2 of Fig. 1, a portion of the associated projection device being shown in full; Fig. 3 is a sectional view taken on the line 3—3 of Fig. 1, the projection device being shown in full; Fig. 4 is a fragmentary sectional view of the projection device and associated mounting taken on the line 4—4 of Fig. 3 and showing the interlock therebetween; Fig. 5 is a horizontal sectional view of a modified form of mounting in which the projection device is pivotally mounted on the supporting structure; Fig. 6 is a vertical sectional view taken on the line 6—6 of Fig. 5, the associated projection device and holder being shown in side elevation; and Fig. 7 is a rear elevation of the mounting illustrated in Figs. 5 and 6 with the supporting structure shown in section.

Referring to Figs. 1 to 4, illustrating the preferred embodiment of my invention, the projection unit there shown comprises a projection device or reflector lamp 10 supported in a suitable holder or mounting 11, which in turn is adjustably secured to the supporting structure or frame member 12. As previously stated the projection device or reflector lamp 10 is of the type described and claimed in my said co-pending applications Serial Nos. 68,713 and 143,504, and comprises a bulb or envelope 13 consisting of a preformed pressed glass reflector section 14 sealed around its periphery to a preformed pressed glass cover or lens section 15. The said reflector and cover glass sections, 14 and 15 respectively, are preferably made of low-expansion glass, such as that commercially known as "Pyrex" and described and claimed in United States Patent No. 1,304,623, Sullivan et al., issued May 27, 1919. The interior surface 16 of the reflector section 14 may be of paraboloidal or any other desirable shape, and is covered with a metallic coating 17 constituting a reflecting surface. By pressing the reflector section 14 rather than blowing the same, the interior paraboloidal surface 16 can be made with extreme accuracy, much more so than is possible with the conventional stamped metal reflectors or with blown glass reflectors. The metallic coating 17 is preferably of aluminum, although any other suitable material may be employed. A concentrated light source, comprising a horizontally disposed filament 18, is mounted within the bulb or envelope 13 by lead wires 19, terminal members 20, and metal cups 21, and is accurately positioned at the focal point of the reflecting surface 17 and in the same plane as that of the terminal members 20. The metal cups 21 are preferably sealed to glass bosses 22 in the manner described and claimed in the co-pending United States patent application Serial No. 85,516, filed June 16, 1936, by A. Greiner, E. J. Westerlund and the applicant herein. It is essential that the metal cups 21 be made of a metal to which the fused or softened glass will readily "wet" and stick, and should preferably have the same expansion as the glass, as near as may be. For low-expansion heat-resistant glass of the character hereinbefore indicated, I prefer to make the metal cups 21 of an alloy of iron, nickel and cobalt commercially known as "Fernico," and disclosed and claimed in United States Patent No. 1,942,260, issued January 2, 1934, to H. Scott. I have found that this particular alloy admirably fulfills the above-mentioned requirements. The bulb 10 is evacuated through an opening 23, and if desired, may be filled with an inert gas, such as argon, nitrogen, or a mixture thereof.

The mounting or holder 11 for the reflector lamp 10 comprises an annular support ring 24 provided with an annular seat or ledge 25 around the inner edge thereof. This support ring 24 is secured to the supporting structure 12 in any suitable manner, and may be integral therewith if desired, but I prefer to mount the same so as to be capable of adjustment with respect to said supporting structure 12. For this purpose I provide a plurality of studs 26 (Figs. 1 and 3) on the support ring 24 secured thereto in any suitable manner as by welding, and extending inwardly and spaced at intervals around the periphery of the same. These studs are adapted to project through corresponding holes or openings 27 provided in the flange 28 of the supporting structure 12. A pair of nuts 29 threaded on each stud 26 at opposite sides of the flange 28 provides the adjustment means for the support ring 24. To properly position the lamp 10 in the holder or mounting 11 so as to be supported in the correct plane to give the desired direction to the projected beam of light, I have provided an annular mounting shoulder 30 on the outer surface of the reflector section 14 of the lamp adjacent the periphery of the same. This shoulder 30 is accurately located with respect to the axis of the paraboloidal reflecting surface 17, and is adapted to be held or clamped against the annular mounting seat 25 on the support ring 24 by means of an annular retaining ring 31 and a plurality of tightening screws 32 (Figs. 1 and 2) spaced at intervals around the periphery thereof. A gasket 33 of cork, rubber, or other suitable material is preferably inserted between the retaining ring 31 and the support ring 24. While I prefer to dispose the annular mounting shoulder 30 on the lamp perpendicularly with respect to the axis of the reflector section 14, the same may be located in any other predetermined relation with respect to such axis.

By adjusting the plane of the mounting seat 25 with respect to the supporting structure 12 through the adjustment means 26 and 29, the reflector axis, and consequently the projected beam of light can be aimed in the desired direction with respect to the supporting structure. Once the plane of the mounting seat 25 has been initially set in the desired position, any replacement of the original lamp 10 will be automatically located in the same exact position as the original, due to the accurately located mounting shoulder 30 on each lamp, so that the beam of light will be projected in exactly the same direction as before. Although it is not necessary to do so, I have shown the supporting structure 12 recessed to receive the lamp 10 and its mounting 11 and permit the same to be mounted flush with the outer surface of said supporting structure to thereby carry out modern streamlining trends.

Where the cover glass section 15 is in the form of a lens having flutes and prisms on either the inner or outer surface thereof, it is further necessary to position and lock the lamp 10 in its mounting 11 in the correct rotative or angular position with respect thereto. Referring particularly to Figs. 3 and 4, I provide for this purpose positioning means in the form of a lug or protuberance 34 extending rearwardly from the annular mounting shoulder 30 on the reflector section 14 of the lamp, which lug 34 is adapted to project into, and be snugly received by an opening or recess 35 in the annular mounting seat 25 of the support ring 24. By locating the lug 34 at the proper point on the annular mounting shoulder 30 with respect to the flutes and prisms on the lens 15, the lamp will be thereby positioned and locked in the correct rotative or angular position with respect to the holder or mounting 11 when said lug 34 is received in the recess 35.

In Figs. 5 to 7 I have illustrated a modified form of projection unit in which the lamp holder is pivoted at opposite sides to permit adjustment of the tilt or angle of the light beam projected by the lamp. In this modification the projection unit comprises a lamp 10, of the type described above in connection with Figs. 1 to 4, supported in a pivoted holder or mounting. This holder or mounting comprises a carrier member 36 pivoted in a casing or frame member 37, a spacer ring 38, an annular thrust or clamping block 39, and tightening bolts 40. The carrier member 36 is pivotally mounted in the casing 37 by means of pins 41 disposed at opposite sides of said member adjacent the forward end thereof. The axis of rotation of member 36 is preferably located horizontally so that the beam of light projected by the associated lamp may be adjusted in a vertical plane. The said carrier member 36 consists of an annular retaining ring portion 42 and a pair of diametrically opposite resilient clamp arms 43 extending rearwardly therefrom. The outer edge of the ring portion 42 is turned inwardly to provide a retaining or mounting flange 44 which overlaps the periphery of the associated lamp 10 to thereby retain the same within the holder. As shown in Figs. 5 and 6, I prefer to form a suitable mounting shoulder 45 around the periphery of the cover or lens section 15 of the lamp, which shoulder is adapted to be seated and clamped against the mounting flange 44. The inner extremities of the arms 43 are formed with inwardly turned portions 46 extending towards each other and against which the spacer ring 38 is adapted to seat. The tightening bolts 40 project through openings provided in the portions 46, and are also threaded through openings in ears 47 on the spacer ring 38 so as to engage the rear surface of the annular thrust block 39. The said thrust block is formed with a curved seat 48 substantially conforming to the contour of and engaging the outer surface of the reflector section 14 of the lamp.

In assembling the lamp 10 within the holder, the lamp is first seated on the mounting flange 44 and the annular thrust block 39 then placed in correct position with its seat 48 in engagement with the outer surface of the lamp reflector section 14. The spacer ring 38 is next inserted between the thrust block 39 and the inturned portions 46 of the clamp arms 43, and the latter sprung so as to aline the bolt openings in the spacer ring ears 47 and inturned portions 46. The tightening bolts 40 are then inserted from the rear through the alined openings, it being understood that the bolts are threaded in the spacer ring openings. By screwing the bolts against the rear surface of the thrust block 39, the spacer ring 38 is forced against the inturned portions 46 of the clamp arms, thereby securely fastening the lamp 10 in the holder.

The casing 37 is cylindrical in section and is adapted to telescopically fit over a housing 49 rigidly secured to the supporting structure 50 of the vehicle. The casing 37 is secured to the housing 49 by a fastening screw 51. To permit adjustment of the lamp on its pivotal supports 41, I provide adjustment means comprising a small plate spring 52 rigidly secured to the bottom portion of the housing 49 and an adjusting screw 53 threaded through the top portion of said housing. The spring 52 is adapted to press against a metal plate 54 fastened to the bottom of the thrust block 39, thus tending to rotate the carrier member 36 on its pivots 41 so that the beam projected by the associated lamp 10 will be directed downwardly, where it will not interfere with the vision of approaching drivers or pedestrians. The adjusting screw 53 is adapted to engage a metal plate 55 fastened to the top of the thrust block 39, thus acting as a stop for limiting the pivotal movement of the carrier member 36 induced by the spring 52. By adjusting this screw 53, the beam of light projected by the lamp may be aimed in the desired direction with respect to the associated supporting structure 50.

It is evident that with the above disclosed mounting arrangements no socket for electrical connection, or for holding the lamp, is necessary. Such mountings support the lamp at a point where it can be secured to the best advantage mechanically to reduce the danger of breakage of the same, and in addition, the electrical connections may be readily made simply by clipping the current supply wires to the lamp terminal members.

What I claim as new and desire to secure by Letters Patent of the United States is:

1. In a light projection unit, the combination of a lamp comprising a light source enclosed in a pressed glass bulb having a concave reflector section with a pressed inner reflecting surface and a cover glass section, said light source being located in definite predetermined relationship to said reflecting surface, said bulb having a pressed annular mounting shoulder thereon accurately located in predetermined relationship with respect to said reflecting surface, and a supporting structure comprising a frame member having an opening therein to receive the lamp, a rigid lamp supporting ring member adjacent said opening having an annular seating shoulder thereon engaging directly with the said mounting shoulder on the lamp, means for clamping said lamp mounting shoulder against said ring seating shoulder, and means for adjustably supporting said ring from said frame member.

2. In a light projection unit, the combination of a lamp comprising a light source enclosed in a pressed glass bulb having a concave reflector section with a pressed inner reflecting surface and a cover glass section, said light source being located in definite predetermined relationship to said reflecting surface, said bulb having a pressed annular mounting shoulder thereon accurately located in predetermined relationship with respect to said reflecting surface, and a supporting structure comprising a frame member having an opening therein to receive the lamp, a rigid lamp supporting ring member adjacent said opening having an annular seating shoulder thereon engaging directly with the said mounting shoulder on the lamp, said lamp mounting shoulder and ring seating shoulder having interlocking engagement means for locating said lamp in a predetermined angular relationship in the supporting structure, means for clamping said lamp mounting shoulder against said ring seating shoulder, and means for adjustably supporting said ring from said frame member.

3. In a light projection unit, the combination of a lamp comprising a light source enclosed in a pressed glass bulb having a concave reflector section with a pressed inner reflecting surface and a cover glass section, said bulb having a peripheral flange at its maximum diameter with a pressed annular mounting shoulder thereon accurately located in predetermined relationship with respect to said reflecting surface, and a supporting structure comprising a frame member having an opening therein to receive the lamp, a rigid lamp supporting ring member adjacent said opening having an annular seating shoulder thereon engaging directly with the mounting shoulder on the lamp, means for clamping said lamp mounting shoulder against said ring seating shoulder, and means for adjustably supporting said ring from said frame member.

4. In a light projection unit, the combination of a lamp comprising a light source enclosed in a bulb having a concave reflector section and a cover glass section, said bulb having a peripheral flange at its maximum diameter with an accurately formed annular mounting shoulder on its rear surface, and a supporting structure comprising a frame member having an opening therein to receive the lamp, a rigid lamp supporting ring member adjacent said opening having an annular seating shoulder thereon engaging directly with the mounting shoulder on the rear of the lamp flange, a second ring member engaging the front of said lamp flange, means for drawing said rings together to clamp the said lamp mounting shoulder against said ring seating shoulder, and means for supporting said ring members from said frame member in adjustable relation thereto.

5. In a light projection unit, the combination of a lamp comprising a light source enclosed in a bulb having a concave reflector section and a cover glass section, said bulb having a peripheral flange at its maximum diameter with an accurately formed annular mounting shoulder on its rear surface, and a supporting structure comprising a frame member having an opening therein to receive the lamp, a rigid lamp supporting ring member adjacent said opening having an annular seating shoulder thereon engaging directly with the mounting shoulder on the rear of the lamp flange, a second ring member engaging the front of said lamp flange, means for drawing said rings together to clamp the said lamp mounting shoulder against said ring seating shoulder, and a plurality of studs extending outward from said first-mentioned ring member and adjustably engaging said frame member adjacent the opening therein for supporting the said ring member.

6. In a light projection unit, the combination of a lamp comprising a light source enclosed in a pressed glass bulb having a concave reflector section with a pressed inner reflecting surface and a cover glass section, said bulb having a peripheral flange at its maximum diameter with a pressed annular mounting shoulder on its front surface accurately located in predetermined relationship with respect to said reflecting surface, and a supporting structure comprising a frame member including a casing surrounding the lamp and having an opening therein to receive said lamp, a rigid ring member surrounding the lamp bulb flange and having an inwardly extending flange thereon constituting a mounting seat engaging with the said mounting shoulder on the lamp bulb, said ring having a pair of diametrically opposed pins extending outwardly therefrom and supported by said casing, clamp arms extending rearwardly from said ring, means engaged by said clamp arms for engaging the rear of said lamp bulb to clamp the mounting shoulder thereon against the said ring seating shoulder, and means on said supporting structure for pivotally adjusting said ring member through rotation on its said pins.

DANIEL K. WRIGHT.